United States Patent [19]

Schaarschmidt et al.

[11] Patent Number: 4,469,362
[45] Date of Patent: Sep. 4, 1984

[54] GRIPPER ARRANGEMENT FOR A HOISTING APPARATUS

[75] Inventors: Joachim Schaarschmidt, Stutensee; Erwin Deibel, Rastatt, both of Fed. Rep. of Germany

[73] Assignee: Maag Gear-Wheel & Machine Co. Ltd., Zurich, Switzerland

[21] Appl. No.: 382,696

[22] Filed: May 27, 1982

[30] Foreign Application Priority Data

Jun. 12, 1981 [CH] Switzerland .................. 3871/81

[51] Int. Cl.³ .............................................. B66C 1/42
[52] U.S. Cl. .................................. 294/116; 81/27.18; 269/233; 414/751
[58] Field of Search ............... 414/222, 225, 226, 589, 414/590, 749, 751, 753; 279/28, 110, 119, 121; 81/57.17, 57.18, 180 R; 294/86 R, 116, 113; 269/229, 233, 235–239

[56] References Cited

U.S. PATENT DOCUMENTS

| | | | |
|---|---|---|---|
| 3,127,710 | 4/1964 | Karbowski | 269/233 X |
| 3,709,379 | 1/1973 | Kaufeldt | 414/591 |
| 3,737,157 | 6/1973 | Kiwalle | 269/239 X |
| 4,221,249 | 9/1980 | Mazzeo et al. | 81/180 R |

FOREIGN PATENT DOCUMENTS 1144775  3/1969  United Kingdom ............... 294/116

Primary Examiner—Robert J. Spar
Assistant Examiner—Donald W. Underwood
Attorney, Agent, or Firm—Werner W. Kleeman

[57] ABSTRACT

A gripper arrangement for a lifting or hoisting apparatus serves to transport workpieces having a journal or plug-like end. This gripper arrangement or gripper contains a housing in which two slides are essentially symmetrically arranged and radially displaceably guided with respect to a primary or main axis. At each of the slides there is supported a respective clamping or chucking jaw by means of a related guide device which is connected with the related clamping jaw by means of a radial inner hinge joint and with the related slide by means of a radial outer hinge joint which is arranged further towards the outside in axial direction than the radial inner hinge joint. Within the housing there is rotatably mounted a control body member which is operatively coupled with a drive motor. At the control body member there are formed control cams which, during rotation of the control body member, displace the slides. The axial symmetrically displaceable slides render possible, on the one hand, an accommodation of the gripper to workpieces having different journal or plug diameters and, on the other hand, a rapid, rigid or firm and exactly central clamping or chucking of the journal or plug-like end of each individual workpiece which is handled.

12 Claims, 5 Drawing Figures

GRIPPER ARRANGEMENT FOR A HOISTING APPARATUS

BACKGROUND OF THE INVENTION

The present invention relates to a new and improved construction of a gripper arrangement or gripper for a lifting or hoisting apparatus for handling, and especially for transporting workpieces having a plug or journal-like end.

Such workpieces, for instance essentially vertically arranged shafts, which are provided at their upper end with a respective journal or plug, also king pins or the like, during the course of their machining operation or assembly frequently must be removed from one machine or a supply magazine and deposited in an exact position at a different location. There is known to the art for this purpose hoisting or lifting equipment which is capable of accomplishing such type of transport operations with exactly controlled movements, for instance along the three axes of a spatial coordinate system.

SUMMARY OF THE INVENTION

It is a primary object of the present invention to provide a new and improved construction of a gripper arrangement or gripper for a hoisting or lifting apparatus which enables rapidly and positively seizing, transporting and exactly depositing workpieces of the aforementioned type at predetermined locations.

Still a further significant object of the present invention is directed to a new and improved construction of gripper arrangement for a lifting or hoisting apparatus, which is relatively simple in construction and design, quite economical to manufacture, extremely reliable in operation, not readily subject to breakdown or malfunction, and requires a minimum of maintenance and servicing.

Yet a further important object of the present invention is directed to a novel construction of gripper arrangement or assembly for a hoisting or lifting apparatus which enables seizing in a rapid, reliable and positive fashion workpieces having a protruding or plug-like portion, and maneuvering them to a desired location or site where they can again be deposited.

A further noteworthy object of the present invention is directed to a new and improved construction of gripper arrangement for a hoisting apparatus which enables reliably, safely, protectively and positively seizing and transporting workpieces between various locations and again depositing such workpieces at a defined site.

Now in order to implement these and still further objects of the invention, which will become more readily apparent as the description proceeds, the gripper arrangement or gripper of the present development is manifested by the features that, within a housing connected with the hoisting or lifting apparatus there are provided two or more slides or carriages which are radially displaceably guided symmetrically with respect to a primary or main axis. Each of the slides is provided with a clamping or chucking jaw, and a control body member drivingly coupled with a drive motor is rotatable about the primary axis. Control cams are formed or provided at the control body member, these control cams displacing the slides during rotation of the control body member.

The axially symmetrically displaceable slides or slide members render possible, on the one hand, an adaptation of the gripper assembly to workpieces having different plug or journal diameters and, on the other hand, allows for a rapid, firm or positive and exact central clamping or chucking of the plug or journal-like portion of each individual workpiece.

According to a preferred embodiment constructional embodiment of the invention, at least one of the clamping jaws or jaw members is hingedly supported at the related slide member or slide, so that it can deviate away from or so to speak "side step" the end of the workpiece penetrating between the clamping or chucking jaws and it then automatically prevents slipping or sliding out of the workpiece of exerting a clamping action thereat. This construction of the invention is particularly suitable for an elevationally displaceable, i.e. up-and-down movable gripper having a vertical primary or main axis. In this case the weight of the workpiece itself strives to intensify the clamping action. The slide members or slides therefore need only be moved apart to such an extent that the clamping jaws now opposingly apply a moderate frictional resistance at the plug or journal-like end of the workpiece which penetrates therebetween. During lifting of the gripper assembly or gripper arrangement the same frictional resistance causes a relative movement between the or each, as the case may be, hingedly supported clamping jaw and the related slide member, so that the spacing between the clamping or chucking jaws is reduced and the end of the workpiece is positively fixedly clamped.

Advantageously, the or each, as the case may be, hingedly supported clamping jaw is supported by means of a guide device at the related slide member. The guide device is connected with the clamping jaw by a radial inner hinge joint and with the related slide member or slide by a radial outer hinge joint, which also in axial direction is arranged further towards the outside than the radial inner hinge joint.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
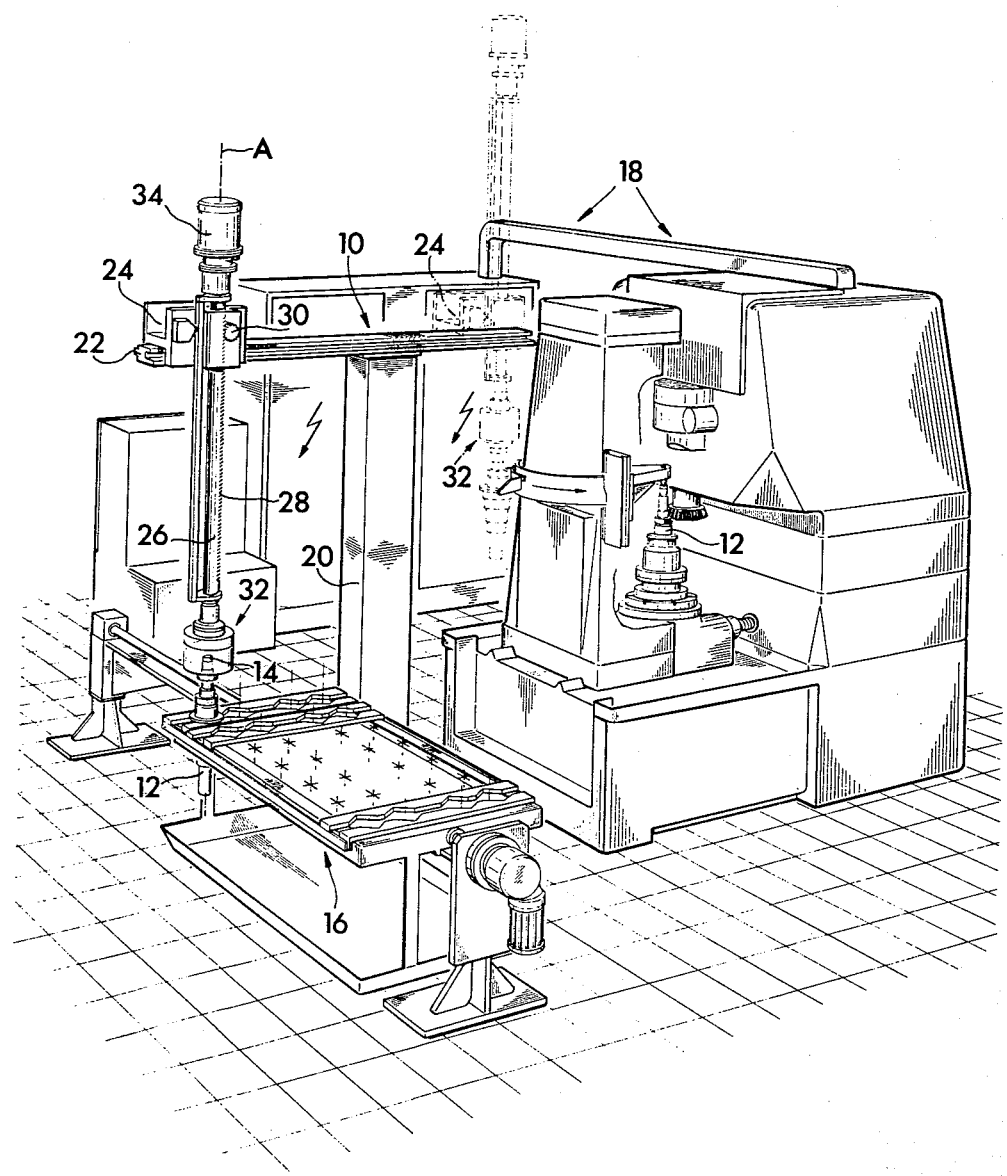
FIG. 1 is a perspective view of a hoisting or lifting apparatus containing a gripper arrangement or gripper assembly according to the invention.

Turning attention now to FIG. 1 of the drawings, the hoisting or lifting apparatus 10 disclosed therein is assigned the task of transporting or conveying workpieces 12, here illustrated as substantially vertically arranged shafts by way of example and not limitation, each of which have a plug or journal-like upper end 14, from a supply magazine 16 to a machine tool 18, here illustrated by way of example as a gear shaper.

Belonging to the workpiece hoisting or lifting apparatus 10 is a stationary vertical column member or beam 20 which is attached to a substantially horizontal rail member 22. Displaceable along the rail member 22 is a lifting and travel mechanism or unit 24 in which there is vertically displaceably guided a vertical tube member or pipe-like element 26. At the outer side or surface of the tube member 26 there is formed or provided a gear rack 28 with which meshes a rotatably drivable pinion 30 arranged at the lifting and travel mechanism 24. At the lower end of the tubular member 26 there is arranged a gripper assembly or gripper arrangement 32 and at the upper end thereof a suitable drive motor 34.

Figure 2:
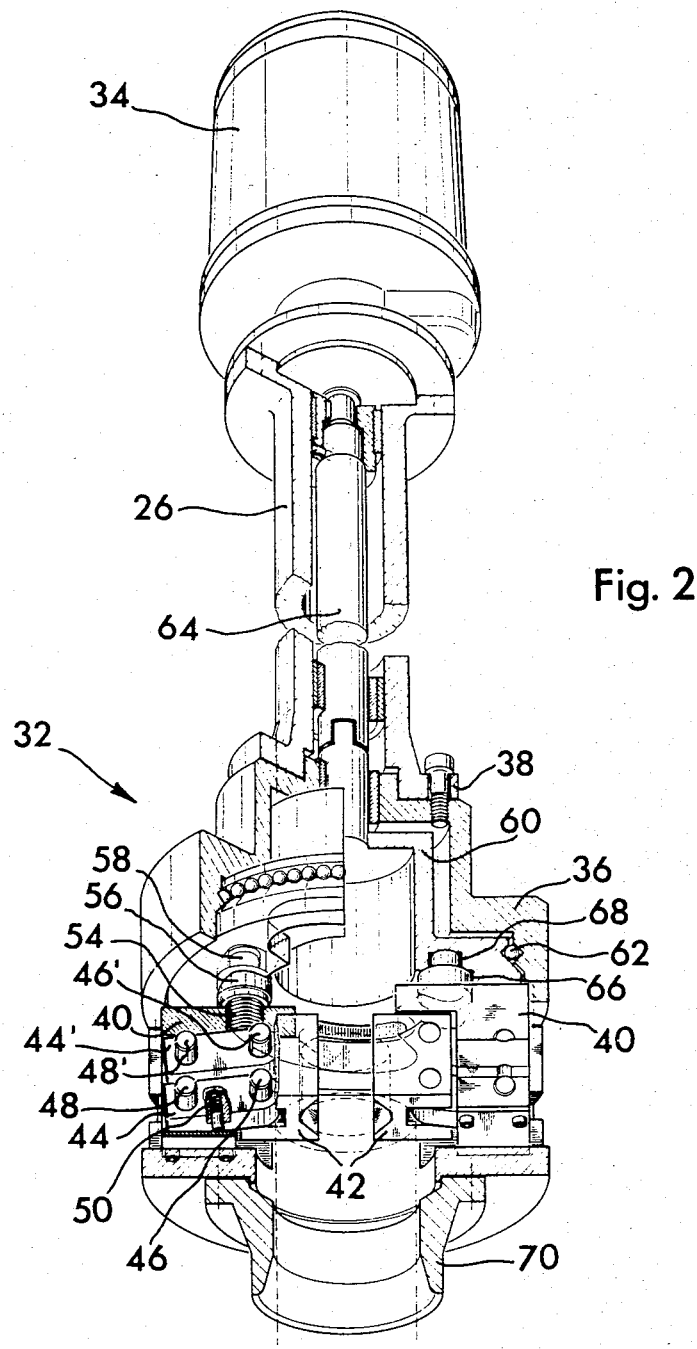
FIG. 2 is a perspective view of the gripper arrangement or assembly, partially shown in sectional view and broken away along its primary or main axis.
Figure 5:
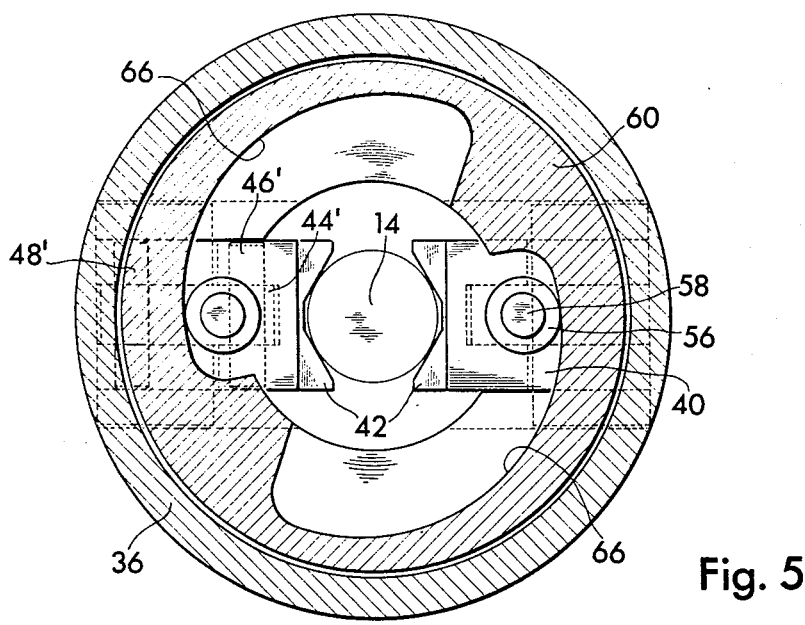
FIG. 5 is a cross-sectional view of the arrangement of FIG. 3, taken substantially along the section line V—V thereof.

The gripper assembly or gripper arrangement 32 is symmetrically constructed in relation to a vertical primary or main axis A which coincides with that of the tubular member 26 and the drive motor 34. Belonging to the gripper arrangement 32 is a housing 36 which, as shown in FIG. 2, is bolted to a flange 38 secured at the lower end of the tubular member 26. Within the housing 36 there are arranged diametrically opposite to one another, in relation to the primary or main axis A, two slides or carriages 40 which are guided to be radially displaceable. At each slide or slide member 40 there is supported a clamping or chucking jaw 42 or equivalent structure which is structured so as to possess a substantially prismatic configuration at its radial inner side or surface, as best seen by referring to FIG. 5.

For the purpose of supporting each clamping or chucking jaw 42 at the related slide member or slide 40 there is provided a lower guide device or guide link 44 or equivalent structure which is connected by a radial inner hinge joint or pivot 46 with the appertaining clamping jaw 42 and by means of a radial outer hinge joint or pivot 48 with the related slide member or slide 40. The radial outer hinge joint 48 is located somewhat lower, and therefore, somewhat closer to the outwardly open lower end of the housing 36, than the radial inner hinge joint 46. Consequently, each of the guide devices or guide links 44 is arranged at an inclination so as to ascend radially towards the inside. The ascent of each of the guide devices or guide links 44, in the depicted rest position of such guide devices 44 as shown in FIGS. 2 and 3, amounts to about 6° with respect to the horizontal.

For the purpose of supporting each of both clamping jaws 42 at the related slide member or slide 40 there is provided an upper guide device or guide link 44' which is arranged above the guide device or guide link 44 and essentially in parallelism therewith. Each guide link 44' is provided with appropriate pivots or hinge joints 46' and 48'. The hinge joints or pivots 46, 48, 46' and 48' are located at the four corners of a parallelogram. Both of the guide links or guide devices 44 and 44' thus form in conjunction with the related slide members or slides 40 and the related clamping jaws 42 a parallelogram link or linkage arrangement which ensures that the clamping or chucking jaws or jaw members 42, during each relative movement in relation to the related slide member 40, remain parallel to themselves. Each of these parallelogram link arrangements is pre-biased upwardly by a related spring member 50 or equivalent structure supported at the lower guide device 44, and thus is urged against an appropriate stop or impact member 52 formed at the corresponding slide member or slide 40.

Threadably connected into each slide member 40 from above is a vertically extending bolt member 54 upon which there is rotatably mounted a follower roll or roller member 56 in such a manner that the free end 58 of the bolt member 54 protrudes upwardly past the roll or roller member 56. A substantially bell-shaped control body member 60 engages over the bolt members 54 and the rolls 56. This bell-shaped control body or control body member 60 is mounted in the housing 36 by means of a ball bearing 62 and is connected with the drive motor 34 by means of a shaft 64 mounted within the tubular member 26. At the inside of the bell-shaped control body 60 there are formed diametrically opposite one another two identical control cams 66 along which travel the follower rolls 56. Two grooves or channels 68 or the like are machined above the control cam 66 in the control body member 60, likewise so as to be located essentially diametrically opposite one another, and the course or contour of such two grooves 68 corresponds to that of the control cams 66. The upper ends 58 of the threaded bolts 54 engage with radial play in a respective one of the grooves 68.

Figure 3:
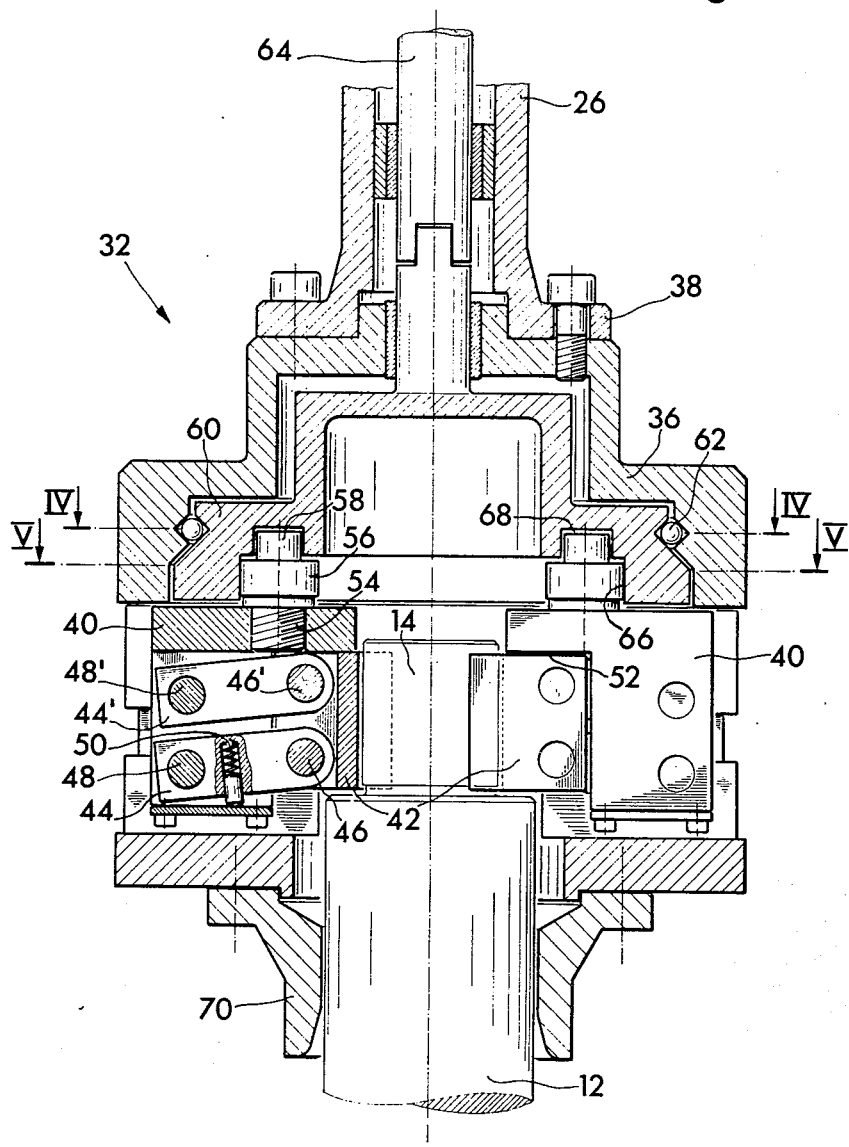
FIG. 3 is an enlarged fragmentary detail sectional view of the gripper arrangement or assembly of FIG. 2 taken along the primary or main axis.
Figure 4:
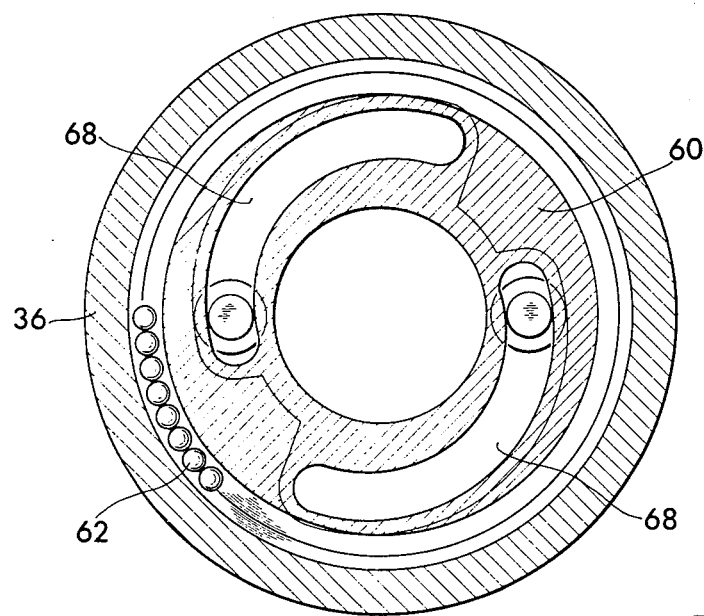
FIG. 4 is a cross-sectional view of the arrangement of FIG. 3, taken substantially along the section line IV—IV thereof.

At the underside of the housing 36 there is attached a pre-centering bushing 70, the internal space of which widens downwardly in a funnel-shaped fashion, as best seen by referring to FIGS. 2 and 3.

Having now had the benefit of the foregoing description of the hoisting or lifting apparatus 10 equipped with a gripper arrangement or gripper assembly as contemplated by the invention, its mode of operation will be described in detail in conjunction with FIG. 1 and is as follows:

The lifting and travel mechanism or unit 24 is located above the workpiece supply magazine 16 or the like in such a manner that the primary or main axis A of the gripper assembly or gripper arrangement 32 is at least approximately in alignment with the lengthwise axis of a workpiece 12 which is to be handled. The tubular member 26 along with the gripper arrangement 32 is lowered onto the workpiece 12, so that its journal or plug-like upper end 14 is centered by the pre-centering bushing or sleeve 70, and to the extent still needed, in relation to the clamping or chucking jaws 42. Consequently, the journal or plug-end 14 of the shaft 12, during the further lowering of the gripper arrangement 32, readily moves between the clamping jaws 42, even if the intermediate space between such clamping jaws 42 is hardly larger than the diameter of the journal or plug-like end 14. Now the drive motor 34, which in the illustrated exemplary embodiment may be constituted by a transmission-rotating field magnet, has its polarity reversed, so that it rotates the control body member 60 through a small angle by means of the shaft 64. The housing 36 is prevented from co-rotating because of the tubular member 26 which is displaceably guided within the lifting and travel mechanism 24 but, however, non-rotatably. Consequently, the rotation of the control body member 60, through the action of the follower rolls 56, causes a radial inwardly directed displacement of the slides or slide members 40. Participating in such displacement are the clamping or chucking jaws 42, since they are prevented by the stop or impact members 52 from upwardly deviating or moving. Therefore, the plug or journal-like upper end 14 of the workpiece 12 is now fixedly retained with a certain starting force by the clamping or chucking jaws 42.

If the gripper arrangement or gripper assembly 32 is upwardly retracted by the lifting and travel mechanism 24, then the workpiece 12 downwardly depends, under the action of its inherent weight, between the clamping jaws 42. Because of the inclined position of the guide devices 44 and 44' the inherent weight of the workpiece 12 generates radial force components which are beneficially effective as additional clamping or chucking forces between the clamping jaws 42 and the plug or journal-like end 14 of the workpiece 12, since the slide members or slides 40 are prevented by the rolls 56 supported at the control cams 66 from deviating or shifting radially towards the outside. The control cams 66 are constructed or configured such that they support in a self-locking fashion the rolls or roller members 56. This means that the described radial clamping or chucking forces are not capable of causing a rotation of the control body member 60. The clamping action therefore also remains reliably intact as a result of the foregoing even if the drive motor 34 is without current.

If the workpiece 12, following its transport to the machine tool 18, should be released, then the drive motor 34 has its polarity reversed, so that it rotates the control body member 60 in the reverse direction. Consequently, the upper ends 58 of the threaded bolts 54 or equivalent structure come into contact with the radial inner wall of the related groove or channel 68 and, during the progressive rotation of the control body member 60, are retracted outwardly away from the primary or main axis A. Consequently, the clamping jaws or jaw members 42 are released from the end 14 of the workpiece 12, so that the gripper arrangement or assembly 32 now can be upwardly moved without entraining the workpiece 12.

While there are shown and described present preferred embodiments of the invention, it is to be distinctly understood that the invention is not limited thereto, but may be otherwise variously embodied and practiced within the scope of the following claims. Accordingly,

What we claim is:

1. A gripper arrangement for a hoisting apparatus for transporting workpieces having a substantially plug-like end, comprising:
   a housing operatively connected with the hoisting apparatus;
   at least two slide members guided to be radially displaceable within said housing and symmetrically with respect to a primary axis;
   a respective clamping jaw provided for each slide member;
   a control body member cooperating with said slide members;
   a drive motor with which there is operatively coupled said control body member;
   said control body member being mounted for rotational movement about said primary axis;
   control cams provided for said control body member;
   said control cams displacing said slide members during rotation of said control body member; and
   means for hingedly supporting at least one of the clamping jaws at its related slide member, so that it can move out of the way of the end of the workpiece penetrating between the clamping jaws and then automatically prevents, by exerting a clamping action, sliding out of such workpiece end.

2. A gripper arrangement for a hoisting apparatus for transporting workpieces having a substantially plug-like end, comprising:
   a housing operatively connected with the hoisting apparatus;
   at least two slide members guided to be radially displaceable within said housing and symmetrically with respect to a primary axis;
   a respective clamping jaw provided for each slide member;
   a control body member cooperating with said slide members;
   a drive motor with which there is operatively coupled said control body member;
   said control body member being mounted for rotational movement about said primary axis;
   control cams provided for said control body member;
   said control cams displacing said slide members during rotation of said control body member;
   means for hingedly supporting at least one of the clamping jaw at its related slide member, so that it can move out of the way of the end of the workpiece penetrating between the clamping jaws and then automatically prevents, by exerting a clamping action, sliding out of such workpiece end;
   each hingedly supporting clamping jaw being supported by means of a guide link at said related slide member;
   a radial inner hinge joint for connecting said guide link with said clamping jaw;
   a radial outer hinge joint for connecting said guide link with said related slide member; and
   said radial outer hinge joint being arranged further towards the outside in axial direction than the radial inner hinge joint.

3. The gripper arrangement as defined in claim 2, further including:
   stop means; and
   spring means for pre-biasing said guide link against said stop means.

4. The gripper arrangement as defined in claim 2, wherein:
   each hingedly supported clamping jaw is supported at the related slide member by a second guide link; and
   said second guide link forming in conjunction with said first guide link a parallelogram linkage arrangement.

5. A gripper arrangement for a hoisting apparatus for transporting workpieces having a substantially plug-like end, comprising:
   a housing operatively connected with the hoisting apparatus;
   at least two slide members guided to be radially displaceable within said housing and symmetrically with respect to a primary axis;
   a respective clamping jaw provided for each slide member;
   a control body member cooperating with said slide members;
   a drive motor with which there is operatively coupled said control body member;
   said control body member being mounted for rotational movement about said primary axis;
   control cams provided for said control body member;
   said control cams displacing said slide members during rotation of said control body member;
   a respective bolt member extending substantially parallel to said primary axis and carried by each slide member;
   a roll mounted at each bolt member; and said roll cooperating with the control cam of the related slide member.

6. The gripper arrangement as defined in claim 5, wherein:
   said control body member has a respective groove for each bolt member;
   each groove being configured in accordance with the related control cam; and
   each of said bolt members protruding with radial play into a respective one of said grooves of the control body member.

7. The gripper arrangement as defined in claim 1, further including:
   a pre-centering bushing member arranged substantially axially and externally of the clamping jaws at the housing.

8. A gripper arrangement for a hoisting apparatus for transporting workpieces having a substantially plug-like end, comprising:
   a housing operatively connected with the hoisting apparatus;
   at least two slide members guided to be radially displaceable within said housing and symmetrically with respect to a primary axis;
   a respective clamping jaw provided for each slide member;
   a control body member cooperating with said slide members;
   a drive motor with which there is operatively coupled said control body member;
   said control body member being mounted for rotational movement about said primary axis;
   control cams provided for said control body member;
   said control cams displacing said slide members during rotation of said control body member;
   a substantially vertically extending tubular member having a lower end and an upper end;
   said housing being attached at the lower end of said tubular member;
   a lifting and travel mechanism;
   said tubular member being guided for elevational movements at said lifting and guiding mechanism;
   said drive motor being supported at the upper end of said tubular member; and
   a shaft arranged within said tubular member for operatively connecting said drive motor with said control body member.

9. The gripper arrangement as defined in claim 8, wherein:
   said tubular member has an outer surface provided with a gear rack; and
   said lifting and travel mechanism having a pinion meshing with said gear rack.

10. The gripper arrangement as defined in claim 1, wherein;
    at least one of said clamping jaws is hingedly supported by said hingedly supporting means in a plane extending substantially parallel to said primary axis to move in a direction substantially radial to said primary axis.

11. The gripper arrangement as defined in claim 1, wherein;
    said hingedly supporting means supports said at least one clamping jaw at its related slide member for movement in a direction substantially parallel to said primary axis in order to prevent unwanted withdrawal of the workpiece from the gripper arrangement by exerting a radial clamping force defining said clamping action on the workpiece which is augmented by a tendency of the workpiece to withdraw from said at least one clamping jaw, while otherwise permitting ready entry of the workpiece between the clamping jaws.

12. The gripper arrangement as defined in claim 1, further including;
    a shaft with which there is operatively coupled said control body member; and
    said shaft being mounted within the hoisting apparatus for rotational movement about said primary axis.

* * * * *